(12) United States Patent
Chang et al.

(10) Patent No.: US 9,733,399 B2
(45) Date of Patent: Aug. 15, 2017

(54) OPTICAL FILM AND DISPLAY DEVICE USING THE SAME

(71) Applicant: Innolux Corporation, Miao-Li County (TW)

(72) Inventors: Chi-Liang Chang, Miao-Li County (TW); Cheng-Hsia Kuo, Miao-Li County (TW)

(73) Assignee: INNOLUX CORPORATION, Miao-Li County (TW)

( * ) Notice: Subject to any disclaimer, the term of this patent is extended or adjusted under 35 U.S.C. 154(b) by 42 days.

(21) Appl. No.: 14/743,002

(22) Filed: Jun. 18, 2015

(65) Prior Publication Data

US 2016/0018570 A1    Jan. 21, 2016

(30) Foreign Application Priority Data

Jul. 15, 2014    (TW) .............................. 103124221 A

(51) Int. Cl.
*G09F 13/04* (2006.01)
*G02B 5/02* (2006.01)
*F21V 8/00* (2006.01)

(52) U.S. Cl.
CPC ......... *G02B 5/0221* (2013.01); *G02B 5/0247* (2013.01); *G02B 5/0278* (2013.01); *G02B 6/0016* (2013.01); *G02B 6/0036* (2013.01); *G02B 6/0038* (2013.01)

(58) Field of Classification Search
CPC .. G02B 5/0221; G02B 5/0247; G02B 5/0278; G02B 6/0016; G02B 6/0036; G02B 6/0038
See application file for complete search history.

(56) References Cited

U.S. PATENT DOCUMENTS

| | | | |
|---|---|---|---|
| 6,672,552 B1 * | 1/2004 | Jao ......................... | A47B 47/00 248/251 |
| 2008/0123364 A1 * | 5/2008 | Chang et al. ........ | G02B 6/0016 362/608 |
| 2009/0220742 A1 | 9/2009 | Wang et al. | |
| 2012/0026720 A1 * | 2/2012 | Cho ..................... | G02B 5/0242 362/84 |
| 2013/0063965 A1 * | 3/2013 | Zhang ..................... | G09F 13/04 362/602 |
| 2014/0126236 A1 * | 5/2014 | Song et al. .......... | G02B 6/0036 362/607 |

FOREIGN PATENT DOCUMENTS

TW    200937043 A    9/2009

OTHER PUBLICATIONS

TW Office Action dated Apr. 21, 2015 in corresponding TW application (No. 103124221).

* cited by examiner

*Primary Examiner* — Y M. Lee
(74) *Attorney, Agent, or Firm* — McClure, Qualey & Rodack, LLP

(57) ABSTRACT

An optical film having a first surface and a second surface is provided. The second surface is adjacent to the first surface and has a first area connected to the first surface, a second area connected to the first area, and a third area connected to the second area. The optical film includes a first micro-structure disposed on the first surface and a second micro-structure disposed in the first area and the second area. The first micro-structure includes a plurality of bubble structures. The second micro-structure includes a plurality of protrusions and recesses.

20 Claims, 9 Drawing Sheets

OPTICAL FILM AND DISPLAY DEVICE USING THE SAME

This application claims the benefit of Taiwan application Serial No. 103124221, filed Jul. 15, 2014, the disclosure of which is incorporated by reference herein in its entirety.

TECHNICAL FIELD

The disclosure relates in general to an optical film and a display device using the same, and more particularly to an optical film having micro-structures and a display device using the same.

BACKGROUND

With the advance of science and technology, various display devices have been widely used in televisions, mobile phones, notebook computers or tablets. Generally, conventional injection and extrusion molding processes have been used to manufacture the light guiding panels, such that the light may be guided to the whole display panel by the light guiding panels.

However, injection and extrusion molding processes may limit the width of the light guiding panel, and it would be difficult to manufacture the light guiding panel having width less than 0.3 mm by such processes. Besides, as the panels become thinner, mura or hotspot issues are more easily to shown, thereby these issues may affect the display quality.

SUMMARY

The disclosure is directed to an optical film and a display device using the same. Micro-structures are formed on the optical film by laser cutting process, such that brightness uniformity issues may be effectively solved and the display device may maintain a thin and slight device.

According to one embodiment, an optical film having a first surface and a second surface is provided. The second surface is adjacent to the first surface and has a first area connected to the first surface, a second area connected to the first area, and a third area connected to the second area. The optical film includes a first micro-structure disposed on the first surface and a second micro-structure disposed in the first area and the second area. The first micro-structure includes a plurality of bubble structures. The second micro-structure includes a plurality of protrusions and recesses.

According to another embodiment, a display device including a backlight module and a display module disposed on the backlight module is provided. The backlight module includes an optical film having a first surface and a second surface and a light source opposed to the first surface. The first surface is a light-entering surface, and the second surface is a light-emitting surface. The second surface is adjacent to the first surface and has a first area connected to the first surface, a second area connected to the first area, and a third area connected to the second area. The optical film includes a first micro-structure disposed on the first surface and a second micro-structure disposed in the first area and the second area. The first micro-structure includes a plurality of bubble structures. The second micro-structure includes a plurality of protrusions and recesses.

Figure 1:
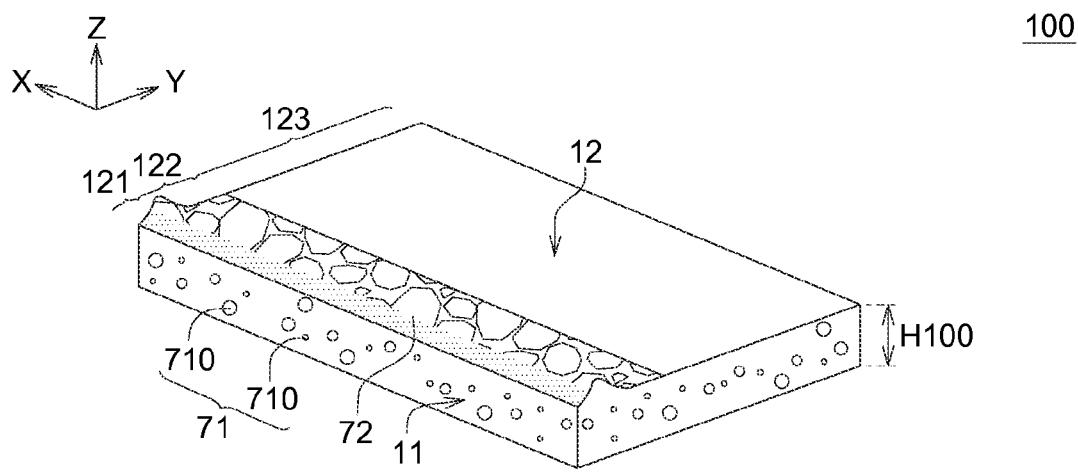
FIG. 1 illustrates a three-dimensional schematic diagram of an optical film according to one embodiment of the disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

DETAILED DESCRIPTION

The embodiments are described in details with reference to the accompanying drawings. The identical elements of the embodiments are designated with the same reference numerals. Also, it is important to point out that the illustrations may not be necessarily drawn to scale, and that there may be other embodiments of the present disclosure which are not specifically illustrated. Thus, the specification and the drawings are regarded as an illustrative sense rather than a restrictive sense.

FIG. 1 illustrates a three-dimensional schematic diagram of an optical film 100 according to one embodiment of the disclosure. Referring to FIG. 1, the optical film 100 has a first surface 11 and a second surface 12 adjacent to the first surface 11. In this embodiment, the second surface 12 has a first area 121 connected to the first surface 11, a second area 122 connected to the first area 121, and a third area 123 connected to the second area 122.

In one embodiment, the optical film 100 may include a first micro-structure 71 and a second micro-structure 72. The first micro-structure 71 is disposed on the first surface 11 and has a plurality of bubble structures 710. The second micro-structure 72 is disposed in the first area 121 and the second area 122 of the second surface 12, and includes a plurality of protrusions and recesses.

According to the embodiment of the disclosure, the first micro-structure 71 and the second micro-structure 72 are formed by a laser cutting process. For example, the first surface 11 may be a cut surface, and the optical filmed 100 is formed by the laser cutting process. Besides, a roughness of the first area 121 and a roughness of the second area 122 are larger than a roughness of the third area 123.

Figure 2A:
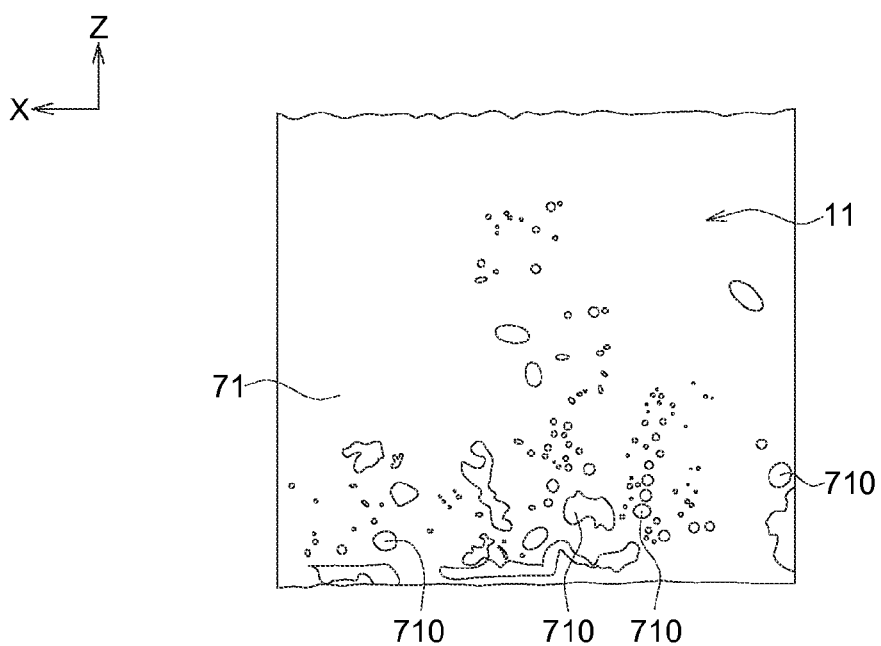
FIG. 2A illustrates a side view of the optical film in X-Z plane according to the embodiment of the disclosure.
Figure 2B:
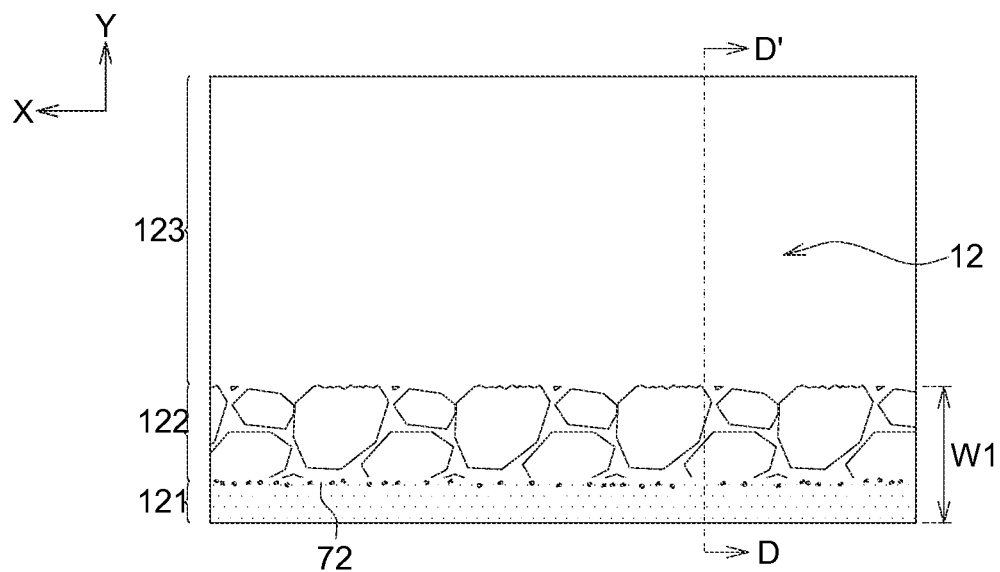
FIG. 2B illustrates a top view of the optical film in X-Y plane according to the embodiment of the disclosure.
Figure 2C:
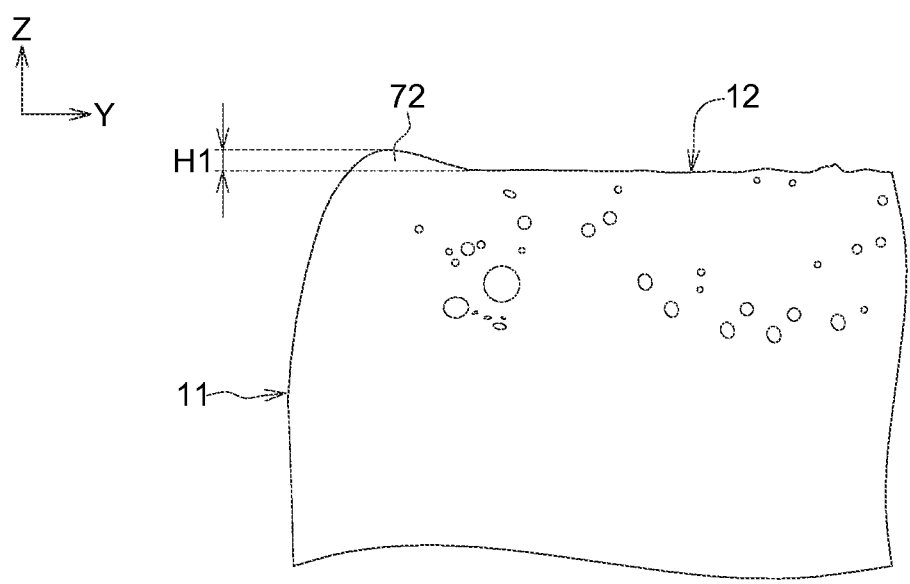
FIG. 2C illustrates another side view of the optical film in Y-Z plane according to the embodiment of the disclosure.

FIG. 2A illustrates a side view of the optical film 100 in X-Z plane according to the embodiment of the disclosure. FIG. 2B illustrates a top view of the optical film 100 in X-Y plane according to the embodiment of the disclosure. FIG. 2C illustrates another side view of the optical film 100 in Y-Z plane according to the embodiment of the disclosure. That is, FIG. 2A to FIG. 2C are top view or side view of the optical film 100 for showing the characterizations of the first surface 11 and the second surface 12.

Figure 3A:
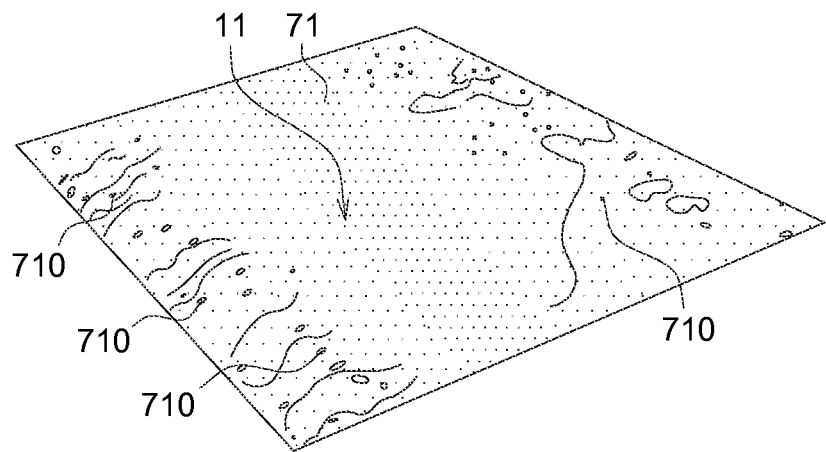
FIG. 3A illustrates a schematic diagram of the first surface of the optical film in another view according to the embodiment of the disclosure.
Figure 3B:
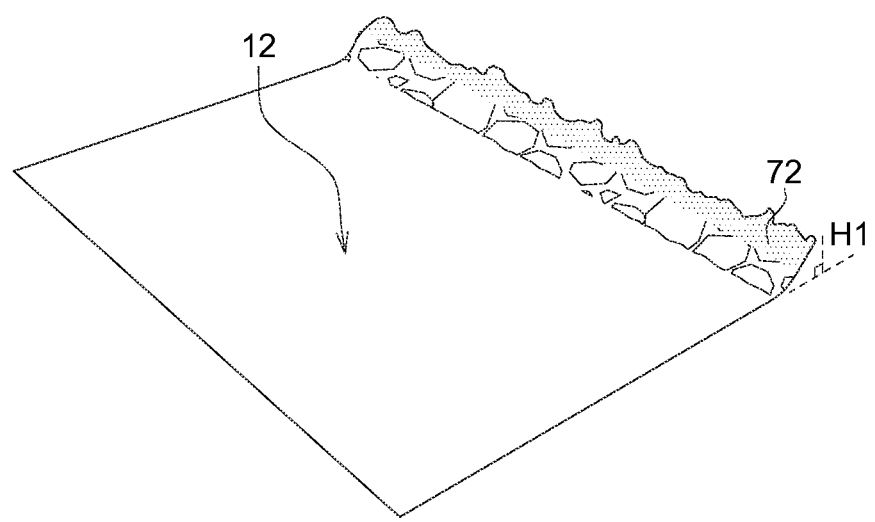
FIG. 3B illustrates a schematic diagram of the second surface of the optical film in another view according to the embodiment of the disclosure.

FIG. 3A illustrates a schematic diagram of the first surface 11 of the optical film 100 in another view according to the embodiment of the disclosure. FIG. 3B illustrates a schematic diagram of the second surface 12 of the optical film 100 in another view according to the embodiment of the disclosure.

As shown in FIG. 2A and FIG. 3A, the first micro-structure 71 disposed on the first surface 11 has bubble structures 710 with various sizes. Besides, the first surface 11 is the cut surface during the laser cutting process and directly in contact with the laser beam. Laser beam makes the plurality of bubble structures to be formed in the first micro-structure 71 and the first surface 11 to be undulant, such that the roughness of the first surface 11 may be between 0 and 10 µm.

As shown in FIG. 2B, the second surface 12 includes the first area 121, the second area 122 and the third area 123. In this embodiment, the first area 121 and the second area 122 are formed after the laser cutting process, and the sum W1 of a width of the first area 121 and a width of the second area 122 is less than 400 µm. Further, as shown in FIG. 1, FIG. 2C and FIG. 3B, the ratio of a height H1 of the protrusions and a thickness H100 of the optical film 100 in the third area 123 is less than 0.15. For example, the height H1 of the protrusions may be between 0 and 60 µm.

Figure 4:
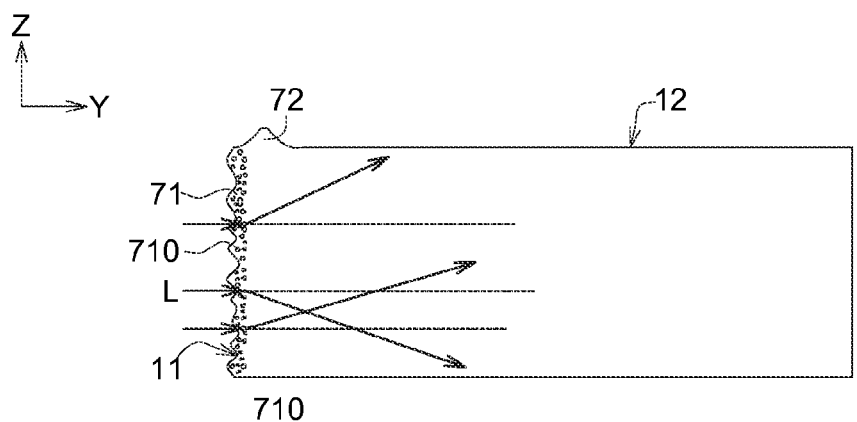
FIG. 4 is a cross-section view of the optical film along D-D' line in FIG. 2B according to the embodiment of the disclosure.

FIG. 4 is a cross-section view of the optical film 100 along D-D' line in FIG. 2B according to the embodiment of the disclosure. It should be noted that the first surface 11 in FIG. 4 has been exaggerated for convenience of explanation that light L is affected by the first micro-structure 71 when entering the optical film 100. In this embodiment, the first surface 11 of the optical film 100 may be a light-entering surface, and the second surface 12 of the optical film 100 may be a light-emitting surface.

As shown in FIG. 4, light L may be in contact with the plurality of bubble structures 710 of the first micro-structure 71 after entering the optical film 100. The bubble structures 710 may change the original path of light L, such that light L may be diffused and hotspots may be reduced.

Besides, since the manufacturing method of the optical film 100 includes the laser cutting process, the first surface 11 and the first area 121 and the second area 122 of the second surface 12 may be melted by the high temperature arisen from the laser beam. The first micro-structure 71 having bubble structures 710 and the second micro-structure 72 having the plurality of protrusions and recesses are formed after the first surface 11 and the first area 121 and the second area 122 of the second surface 12 are cooled and condensed. Therefore, although the first micro-structure 71 and the second micro-structure 72 make the roughness of the first surface 11 and the roughness of the first area 121 and the roughness of the second area 122 rise, the first surface 11 and the second surface 12 still maintain smooth and do not need to be polished.

Figure 5:
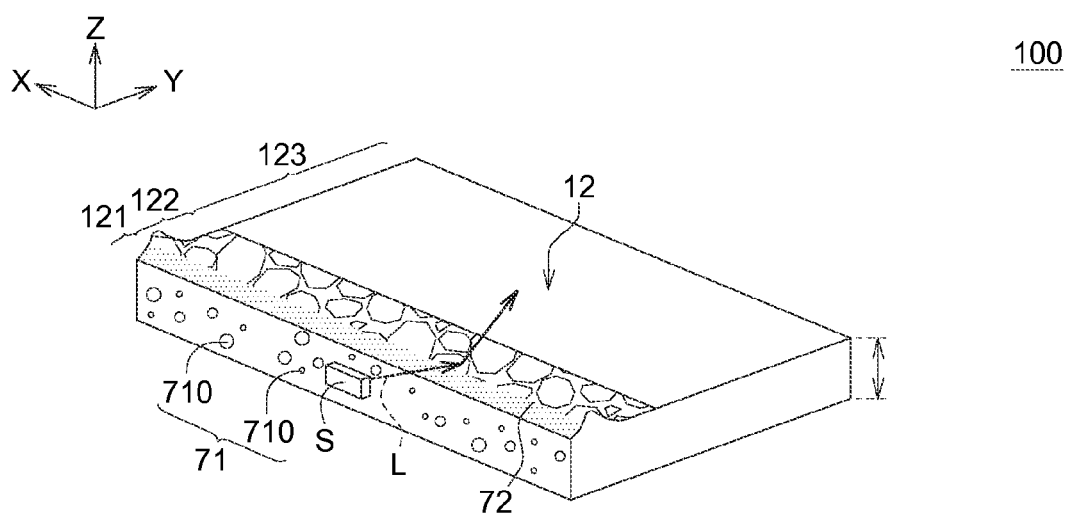
FIG. 5 illustrates a schematic diagram of the path after light L generated by the light source S entering the optical film.

FIG. 5 illustrates a schematic diagram of the path after light L generated by the light source S entering the optical film 100. In this embodiment, the first surface 11 of the optical film 100 may be such as the light-entering surface, the second surface 12 of the optical film 100 may be such as a light-emitting surface. As shown in FIG. 5, since the light-emitting surface includes the second micro-surface 72, light L generated by the light source S may be deflected after passing through the second micro-surface 72, such that light L may be emitted from the light-emitting surface more easily.

In one embodiment, the shape of the protrusions of the second micro-surface 72 may be such as hill-shaped, and the shape of the recesses of the second micro-surface 72 may be such as valley-shaped. The sizes, heights and distances of the protrusions and the recesses may be different from each other. Therefore, when light passes through the protrusions and the recesses of the second micro-surface 72, light may be scattered towards different directions, such that brightness uniformity issues may be effectively solved.

Figure 6:
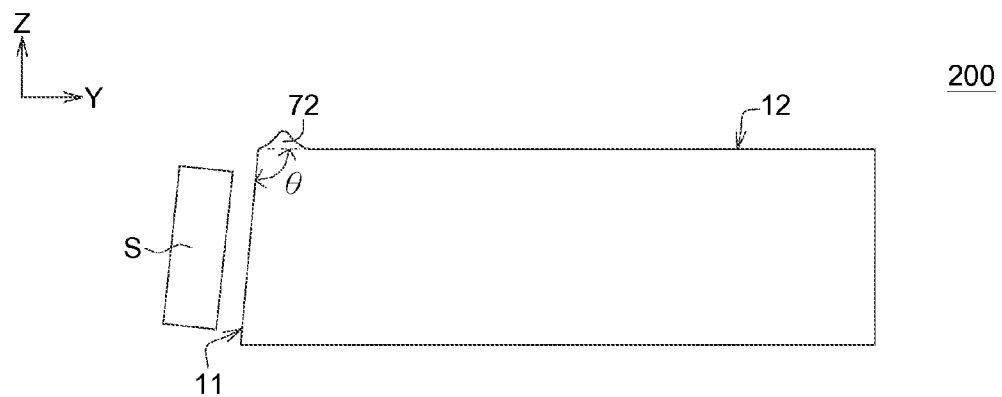
FIG. 6 illustrates a cross-section schematic diagram of an optical film according to another embodiment of the disclosure.

FIG. 6 illustrates a cross-section schematic diagram of an optical film 200 according to another embodiment of the disclosure. In this embodiment, the included angle θ between the first surface 11 and the second surface 12 of the optical film 200 is larger than 90 degrees, such as between 90 and 100 degrees. Besides, the light source S is disposed parallel with the first surface 11. That is, the optical film 200 may have an inclined light-entering surface (first surface 11), and the light source S may be disposed corresponding to the inclined light-entering surface. Such configuration may reduce light leakage from the second surface 12 near the light-entering surface, and the light having the most energy may easily hit the mesh points (not shown in FIG. 6) on the bottom surface, such that the light-emitting efficiency would increase.

The included angle θ between the first surface 11 and the second surface 12 of the optical film 200 is larger than 90 degrees in FIG. 6, but the disclosure is not limited thereto. Instead, the included angle θ between the first surface 11 and the second surface 12 of the optical film 200 may be smaller than 90 degrees, such as between 80 and 90 degrees.

Figure 7:
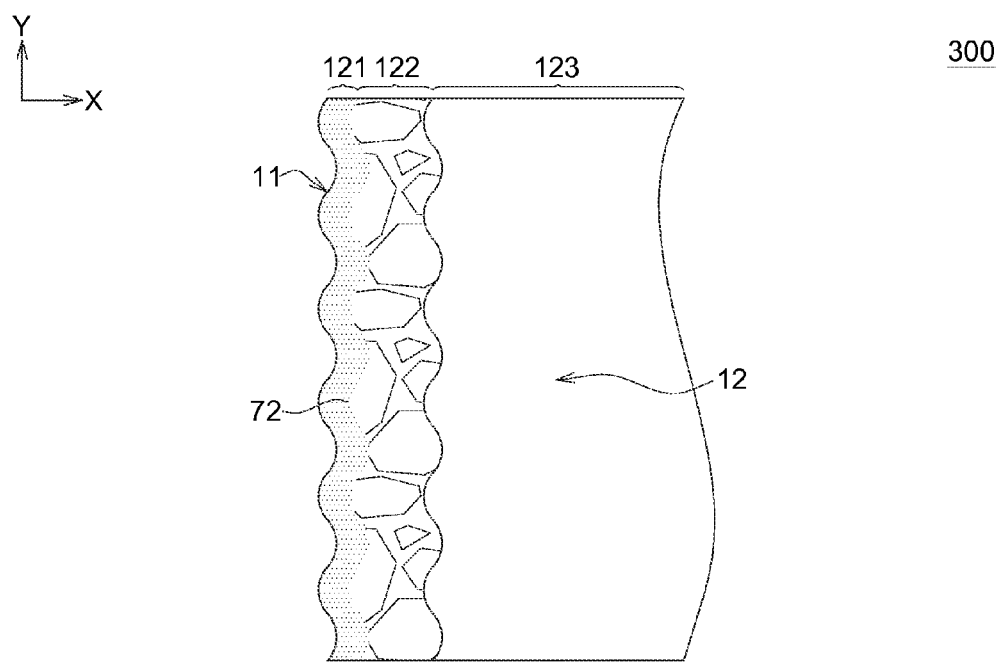
FIG. 7 illustrates a top view of the optical film according to still another embodiment of the disclosure.

FIG. 7 illustrates a top view of the optical film 300 according to still another embodiment of the disclosure. As shown in FIG. 7, the first area 121 and the second area 122 of the second surface 12 may be formed as wave-shaped by the laser cutting process. The wave-shaped structure may also change the path of the light after the light enters the optical film 300 for preventing hotspots.

The first area 121 and the second area 122 of the second surface 12 are formed as wave-shaped in FIG. 7, but the disclosure is not limited thereto. Any shape of the first area 121 and the second area 122 that can improve brightness uniformity issues may be easily formed by the laser cutting process.

Since the optical film is formed by the laser cutting process without additional cutting tools or modules, it is easy to produce inclined light-entering surface (such as the first surface 11 of the optical film 200) or form the first area 121 and the second area 122 of the second surface 12 as other shapes (such as the wave-shaped second surface 12 of the optical film 300). Further, the laser cutting process is a non-contact cutting process which is suitable for cutting thin optical films, so the optical film would not deform by the force of the cutting tools.

Figure 8A:
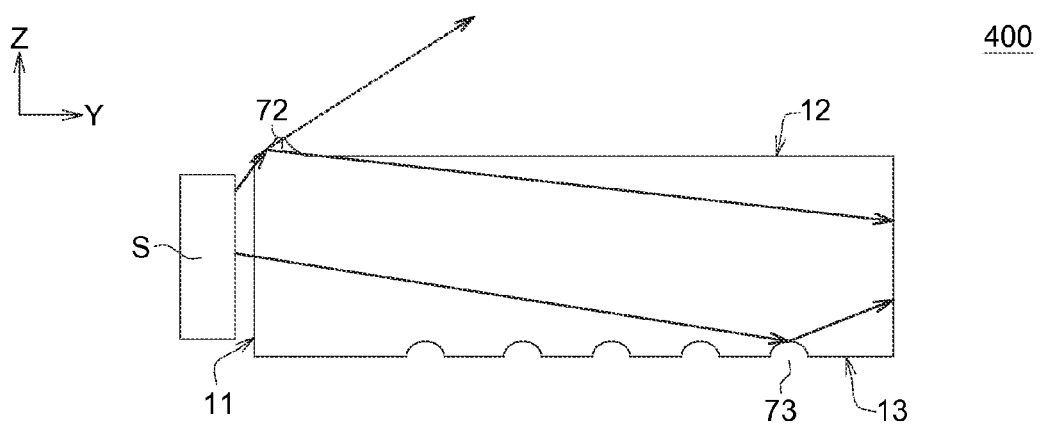
FIG. 8A illustrates a cross-section schematic diagram of an optical film according to one embodiment of the disclosure.

FIG. 8A illustrates a cross-section schematic diagram of an optical film 400 according to one embodiment of the disclosure. Similar to the embodiments mentioned above, the first surface 11 of the optical film 400 is a light-entering surface and may include a first micro-structure (not shown in FIG. 8A), and the light source S is disposed opposite to the first surface 11. The second surface 12 of the optical film 400 is a light-emitting surface and may include a second micro-structure 72. Besides, the optical film 400 further has a third surface 13 substantially parallel to the second surface 12 and adjacent to the first surface 11. In this embodiment, the optical film 400 includes a plurality of mesh points 73 disposed on the third surface 13, and the mesh points 73 are not limited to protrusions or recesses.

Figure 8B:
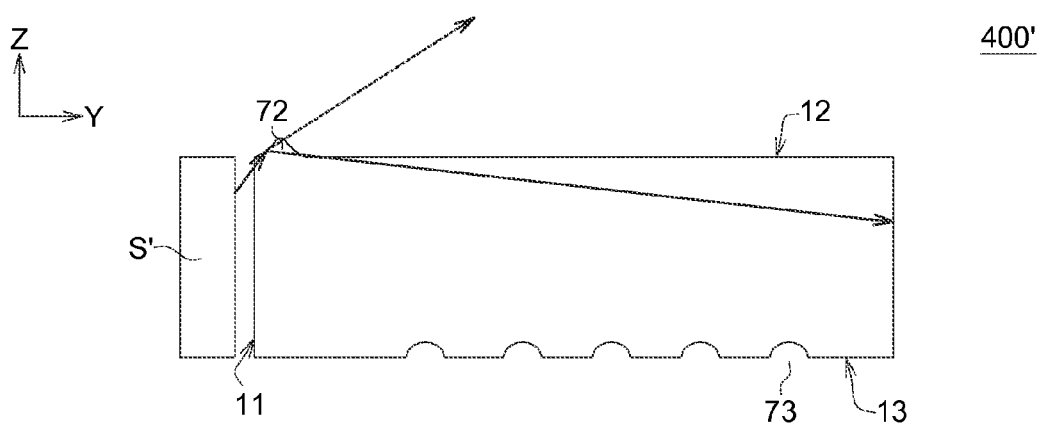
FIG. 8B illustrates a cross-section schematic diagram of an optical film according to another embodiment of the disclosure.

FIG. 8B illustrates a cross-section schematic diagram of an optical film 400' according to another embodiment of the disclosure. It is different from the optical film 400 in FIG. 8A that the height of the light source S' may be the same as the height of the optical film 400' along Z direction. Such structure may increase the amount of the light from the light source S' entering the optical film 400'. Other elements similar to those in FIG. 8A would not be mentioned again here.

Figure 9A:
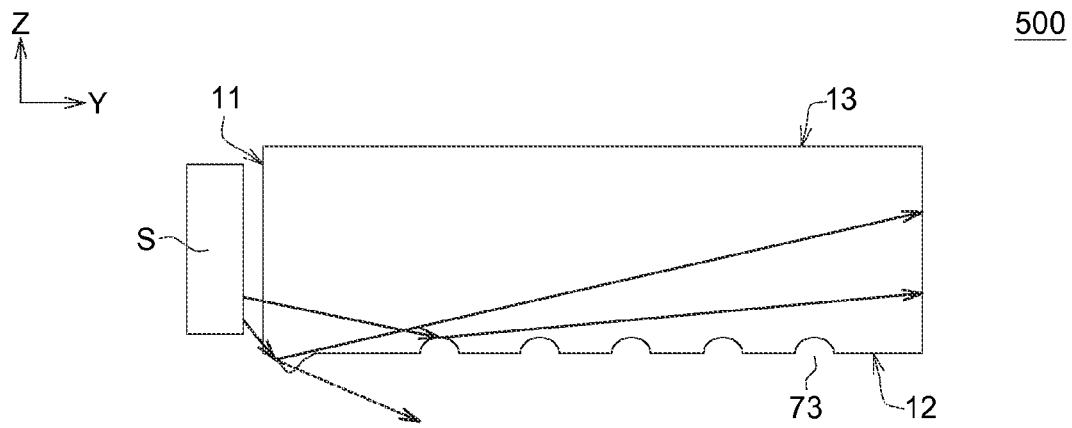
FIG. 9A illustrates a cross-section schematic diagram of an optical film according to the embodiment of the disclosure.

FIG. 9A illustrates a cross-section schematic diagram of an optical film 500 according to the embodiment of the disclosure. As shown in FIG. 9A, the first surface 11 of the optical film 500 is a light-entering surface and may include a first micro-structure (not shown in FIG. 9A), and the light source S is disposed opposite to the first surface 11. In this embodiment, the third surface 13 of the optical film 500 is a light-emitting surface, and the second surface 12 including a second micro-structure 72 is adjacent to the first surface 11 and substantially parallel to the third surface 13. Besides, the optical film 500 also includes a plurality of mesh points 73 disposed on the second surface 12, and the mesh points 73 are not limited to protrusions or recesses.

It should be noted that the position of the second microstructure is determined by the position of the laser in contact with the optical film during the laser cutting process. In the embodiments of the disclosure, the second micro-structure 72 is, for example, disposed in the first area 121 and the second area 122 of the second surface 12. However, the second surface 12 is not limited to be the light-emitting surface of the optical film. For example, the third surface 13 of the optical film 500 is used as the light-emitting surface as shown in the embodiment of FIG. 9A.

Figure 9B:
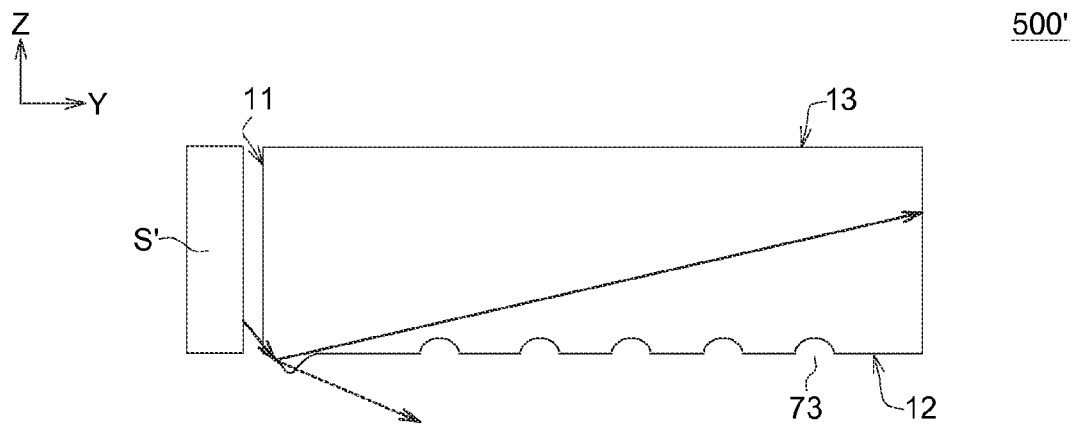
FIG. 9B illustrates a cross-section schematic diagram of an optical film according to another embodiment of the disclosure.

Similarly, FIG. 9B illustrates a cross-section schematic diagram of an optical film 500' according to another embodiment of the disclosure. It is different from the optical film 500 in FIG. 9A that the height of the light source S' may be the same as the height of the optical film 500' along Z direction. Such structure may increase the amount of the light from the light source S' entering the optical film 500'. Other elements similar to those in FIG. 9A would not be mentioned again here.

Figure 10A:
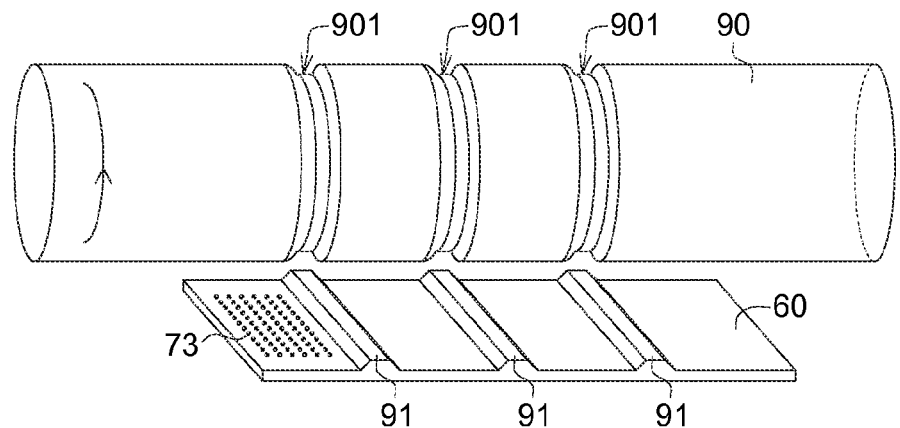
FIG. 10A to FIG. 10O show an embodiment of manufacturing the optical film in the disclosure.

FIG. 10A to FIG. 10O show an embodiment of manufacturing the optical film 600 in the disclosure. As shown in FIG. 10A, a roller is used to implement a roll-to-roll process to form an optical film base structure 60. Then, a laser cutting process is implemented on the optical film base structure 60 by laser beam LS, such that the optical film base structure 60 is divided to form the optical film 600 as shown in FIG. 10O.

Figure 10B:
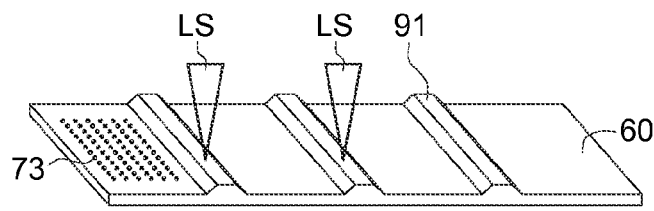
Figure 10C:
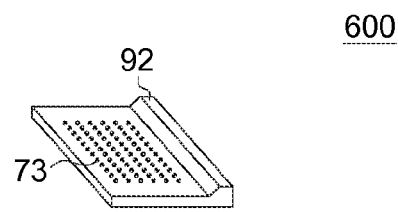

In this embodiment, the roller 90 may include a plurality of grooves 901, such that the grooves 901 would form a plurality of patterned structure 91 on the optical film base structure 60 during the roll-to-roll process. Besides, the laser beam LS cuts the optical film base structure 60 along the patterned structure 91 as shown in FIG. 10B, such that the optical film 600 may include patterned structure 92 as shown in FIG. 10O. However, the disclosure is not limited thereto. Instead, the element labeled 901 on the roller 90 may be a protrusion, and the laser beam LS does not need to cut the optical film base structure 60 along the patterned structure 91. The laser cutting process may be adjusted according to the demand for the optical film 600.

In one embodiment, the optical film 600 may also include a plurality of mesh points 73. The roller 90 may form the mesh points 73 directly on the optical film base substrate 60 during the roll-to-roll process, or the laser beam LS may form the mesh points 73 on the optical film base substrate 60. The laser beam LS may form the mesh points 73 at the same time during the laser cutting process or after the laser cutting process.

In addition to the roller 90 or the laser beam LS, the mesh points 73 may also be formed on the surface of the optical film 600 by screen printing or inkjet printing (IJP). Besides, the mesh points 73 may be formed on the surface of the optical film base substrate 60 by screen printing or inkjet printing mentioned above before the laser cutting process, and then the laser cutting process would be implemented. Alternatively, the mesh points 73 may be formed directly on the surface of the optical film 600 by screen printing or inkjet printing mentioned above after the laser cutting process.

In one embodiment, a surface coating process may be implemented in the optical film 600 to increase the surface hardness of the optical film 600, such that rub scratches may be reduced on the optical film 600, and the body strength may be increased to prevent from warping, or the optical efficiency may further be increased. Similarly, the surface coating process may be implemented on the surface of the optical film base substrate 60 before the laser cutting process, or implemented directly on the surface of the optical film 600 after the laser cutting process.

Figure 11:
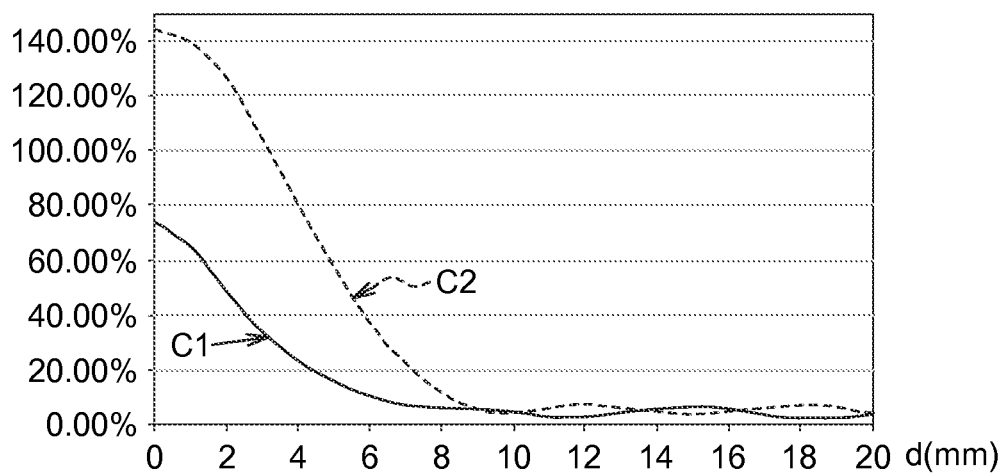
FIG. 11 is a UF index comparing figure between the embodiment of the disclosure and a comparative example.

FIG. 11 is a UF index comparing figure between the embodiment of the disclosure and a comparative example. UF index is a reference value to determine whether the brightness of each point on a plane is uniform, which is defined as that the brightness of the brightest point minus the brightness of the darkest point, and then divided by the brightness of dark spots on a plane at a distance d from the light-entering surface. UF index may be represented by the following equation (1):

$$\frac{\text{the brightness of the brightest point} - \text{the brightness of the darkest point}}{\text{the brightness of the darkest point}} = UF \text{ index} \quad (1)$$

In FIG. 11, X-axis represents the distances d (mm) from the light-entering surface, and Y-axis represents the UF index. Curve C1 is the simulation graphics of the optical film 100 according to the embodiment of the disclosure. The optical film 100 includes the first micro-structure 71 disposed on the first surface 11 (light-entering surface) and the second micro-structure 72 disposed on the second surface 12 (light-emitting surface). Curve C2 is the simulation graphics of the optical film in the comparative example. There is no micro-structure on the light-entering surface or the light-emitting surface of the optical film in the comparative example.

As shown in FIG. 11, in the plane closer to the light-entering surface (for example, d is smaller than 8 mm), the curve C1 (which corresponds to the optical film 100 according to the embodiment of the disclosure) is significantly lower than the curve C2 (which corresponds to the optical film of the comparative example). That is, the difference between the brightness of the brightest point and the brightness of the darkest point of the optical film 100 according to the embodiment of the disclosure is significantly smaller than the difference between the brightness of the brightest point and the brightness of the darkest point of the optical film of the comparative example. Therefore, hotspots are not easily generated.

As shown in the curves C1 and C2 in FIG. 11, since the optical film 100 according to the embodiment of the disclosure includes the first micro-structure 71 disposed on the first surface 11 (light-entering surface) and the second micro-structure 72 disposed on the second surface 12 (light-emitting surface), the path of the light in the optical film 100 may be changed by the first micro-structure 71 and the second micro-structure 72, such that hotspot issues may be effectively solved compared with the optical film (which does not include any micro-structure on the light-entering surface and the light-emitting surface) of the comparative example.

In the embodiments of the disclosure, the material of the optical films 100, 200, 300, 400 and 500 may include polymethyl methacrylate (PMMA), polystyrene (PS), polymethyl methacrylate and styrene copolymer (MS), polycarbonate (PC), polyethylene terephthalate (PET), glass or a light-transmitted material. Further, the optical films 100, 200, 300, 400 and 500 may be applied in the backlight module of the display device. For example, the optical films according to the embodiment of the disclosure may be used as a light guiding panel of a lateral liquid crystal display device.

Figure 12:
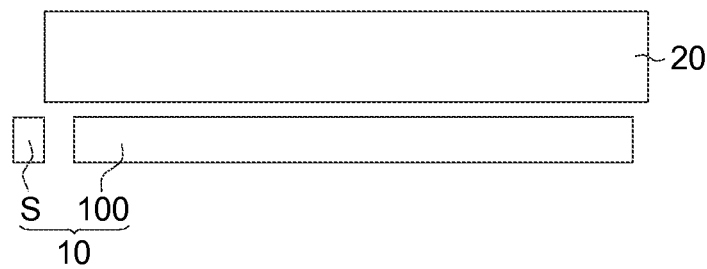
FIG. 12 illustrates a cross-section schematic diagram of display device according to the embodiment of the disclosure.

FIG. 12 illustrates a cross-section schematic diagram of display device 1 according to the embodiment of the disclosure. As show in FIG. 12, the display device 1 may include a backlight module 10 and a display module 20 disposed on the backlight module 10. The backlight module 10 may include the optical film 100 as shown in FIG. 1 to FIG. 5 and a light source S disposed on one side of the optical film 100.

The structure of the optical film 100 may be formed as the structure shown in FIG. 1 to FIG. 5. The optical film 100 has a first surface 11 and a second surface 12 adjacent to the first surface 11. Besides, since the manufacturing method of the optical film 100 may include a laser cutting process, the second surface 12 has a first area 121 connected to the first surface 11, a second area 122 connected to the first area 121, and a third area 123 connected to the second area 122. The optical film 100 may include a first micro-structure 71 and a second micro-structure 72. The first micro-structure 71 is disposed on the first surface 11 and has a plurality of bubble structures 710. The second micro-structure 72 is disposed in the first area 121 and the second area 122 of the second surface 12, and includes a plurality of protrusions and recesses.

In this embodiment, the roughness of the first are 121 and the roughness of the second are 122 are larger than the roughness of the third area 123. The display module 20 may such as include a liquid crystal display panel. It should be noted that although the optical film 100 is taken as an example in FIG. 12, the disclosure is not limited thereto. The optical films 200, 300, 400 and 500 according to other embodiments of the disclosure may also be applied in the display device 1.

As described above, the optical film according to the embodiment of the disclosure include the first micro-structure and the second micro-structure. These micro-structures may change the path of the light after the light enters the optical film, such that the brightness distribution may be more uniform, and the micro-structures may effectively prevent from the hotspot issue, mura issue or bright lines on the edge.

Besides, since the manufacturing method of the optical film includes the laser cutting process, the first surface and part of the second surface may be melted by the high temperature arisen from the laser beam. Although the first micro-structure and the second micro-structure include bubbles or irregular protrusions and recesses which may change the path of the light, the first surface and the second surface still maintain smooth and do not need to be polished.

Furthermore, the manufacturing method of the optical film according to the embodiment of the disclosure includes the roll-to-roll process to form an optical film base substrate, and then the laser cutting process is implemented to form the optical film. The roll-to-roll process may form the optical film base substrate having thickness smaller than 0.3 mm, and the laser beam may cut to form various different-shaped light-entering surfaces or produce mesh points on the optical film (base substrate).

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. An optical film having a first surface and a second surface adjacent to the first surface, the first surface and the second surface defining an included angle, the second surface having a first area connected to the first surface, a second area connected to the first area, and a third area connected to the second area, and the optical film comprising:
    a first micro-structure disposed on the first surface and comprising a plurality of bubble structures; and
    a second micro-structure disposed in the first area and the second area and comprising a plurality of protrusions and recesses,
    wherein the included angle is larger than 90 degrees and less than 100 degrees.

2. The optical film according to claim 1, wherein a roughness of the first area and a roughness of the second area are larger than a roughness of the third area.

3. The optical film according to claim 1, wherein a sum of a width of the first area and a width of the second area is less than 400 μm.

4. The optical film according to claim 1, wherein a ratio of a height of the protrusions and a thickness of the optical film in the third area is less than 0.15.

5. The optical film according to claim 4, wherein the height of the protrusions is between 0 and 60 μm.

6. The optical film according to claim 1, wherein a roughness of the first surface is between 0 and 10 μm.

7. The optical film according to claim 1, wherein the first area and the second area are wave-shaped.

8. The optical film according to claim 1, wherein the optical film further has a third surface substantially parallel to the second surface and adjacent to the first surface, and comprises a plurality of mesh points disposed on the third surface.

9. The optical film according to claim 1, further comprising a plurality of mesh points disposed on the second surface.

10. The optical film according to claim 1, wherein a material of the optical film comprises polymethyl methacrylate, polystyrene, polymethyl methacrylate and styrene copolymer, polycarbonate, polyethylene terephthalate, glass or a light-transmitted material.

11. A display device, comprising:
a backlight module, comprising:
an optical film having a first surface and a second surface adjacent to the first surface, the first surface and the second surface defining an included angle, the second surface having a first area connected to the first surface, a second area connected to the first area, and a third area connected to the second area, the first surface used as a light-entering surface, the second surface used as a light-emitting surface, and the optical film comprising:
a first micro-structure disposed on the first surface and comprising a plurality of bubble structures; and
a second micro-structure disposed in the first area and the second area and comprising a plurality of protrusions and recesses;
a light source opposed to the first surface; and
a display module disposed on the backlight module,
wherein the included angle is larger than 90 degrees and less than 100 degrees.

12. The display device according to claim 11, wherein a roughness of the first area and a roughness of the second area are larger than a roughness of the third area.

13. The display device according to claim 11, wherein a sum of a width of the first area and a width of the second area is less than 400 μm.

14. The display device according to claim 11, wherein a ratio of a height of the protrusions and a thickness of the optical film in the third area is less than 0.15.

15. The display device according to claim 14, wherein the height of the protrusions is between 0 and 60 μm.

16. The display device according to claim 11, wherein a roughness of the first surface is between 0 and 10 μm.

17. The display device according to claim 11, wherein the first area and the second area are wave-shaped.

18. The display device according to claim 11, wherein the optical film further has a third surface substantially parallel to the second surface and adjacent to the first surface, and comprises a plurality of mesh points disposed on the third surface.

19. The display device according to claim 11, wherein the optical film further comprises a plurality of mesh points disposed on the second surface.

20. The display device according to claim 11, wherein a material of the optical film comprises polymethyl methacrylate, polystyrene, polymethyl methacrylate and styrene copolymer, polycarbonate, polyethylene terephthalate, glass or a light-transmitted material.

* * * * *